United States Patent
Porte (10) Patent No.: US 6,698,691 B2
(45) Date of Patent: Mar. 2, 2004

(54) PROCESS FOR DE-ICING BY FORCED CIRCULATION OF A FLUID, AN AIR INTAKE COWLING OF A REACTION MOTOR AND DEVICE FOR PRACTICING THE SAME

(75) Inventor: Alain Porte, Colomiers (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 10/074,053

(22) Filed: Feb. 14, 2002

(65) Prior Publication Data

US 2002/0139899 A1 Oct. 3, 2002

(30) Foreign Application Priority Data

Feb. 15, 2001 (FR) .............................. 01 02090

(51) Int. Cl.[7] .................................. B64D 15/04
(52) U.S. Cl. .................................... 244/134 B
(58) Field of Search .................. 244/134 B, 57, 244/53 B, 134 R, 134 A (56) References Cited

U.S. PATENT DOCUMENTS

| | | | | |
|---|---|---|---|---|
| 3,612,173 A | * | 10/1971 | Goyal ..................... 165/122 |
| 3,820,628 A | * | 6/1974 | Hanson ..................... 181/214 |
| 3,821,999 A | * | 7/1974 | Guess et al. ............... 181/296 |
| 3,910,374 A | * | 10/1975 | Holehouse ................. 181/292 |
| 3,917,193 A | * | 11/1975 | Runnels, Jr. ............... 244/207 |
| 3,933,327 A | * | 1/1976 | Cook et al. ............. 244/134 B |
| 3,948,346 A | * | 4/1976 | Schindler ................... 181/286 |
| 4,475,624 A | * | 10/1984 | Bourland et al. ........... 181/292 |
| 4,482,114 A | * | 11/1984 | Gupta et al. ............ 244/134 B |
| 4,508,295 A | * | 4/1985 | Cattaneo et al. ......... 244/134 A |
| 4,522,859 A | * | 6/1985 | Blair ........................ 428/116 |
| 4,688,745 A | * | 8/1987 | Rosenthal ............... 244/134 R |
| 4,738,416 A | * | 4/1988 | Birbragher ............. 244/134 B |
| 4,743,740 A | * | 5/1988 | Adee .......................... 219/548 |
| 4,749,150 A | * | 6/1988 | Rose et al. ................ 244/53 B |
| 4,757,963 A | * | 7/1988 | Cole ...................... 244/134 B |
| 4,759,513 A | * | 7/1988 | Birbragher ................. 244/1 N |
| 4,926,963 A | * | 5/1990 | Snyder ....................... 181/290 |
| 5,011,098 A | * | 4/1991 | McLaren et al. ....... 244/134 B |
| 5,025,888 A | * | 6/1991 | Arcas et al. ................ 181/213 |
| 5,041,323 A | * | 8/1991 | Rose et al. ................. 428/116 |
| 5,041,324 A | * | 8/1991 | Siegling et al. ............. 428/119 |
| 5,088,277 A | * | 2/1992 | Schulze ................... 60/39.093 |
| 5,415,522 A | * | 5/1995 | Pla et al. .................... 415/118 |
| 5,423,658 A | * | 6/1995 | Pla et al. .................... 415/118 |
| 5,498,127 A | * | 3/1996 | Kraft et al. ................. 415/119 |
| 5,590,849 A | * | 1/1997 | Pla ............................ 244/1 N |
| 5,683,062 A | * | 11/1997 | Spiro et al. ................ 244/121 |
| 5,702,231 A | * | 12/1997 | Dougherty ................. 415/119 |
| 5,776,579 A | * | 7/1998 | Jessup et al. ................ 428/73 |
| 5,841,079 A | * | 11/1998 | Parente ...................... 181/214 |
| 5,944,287 A | * | 8/1999 | Rodgers ................. 244/134 R |
| 6,371,411 B1 | * | 4/2002 | Breer et al. ............. 244/134 R |
| 6,457,676 B1 | * | 10/2002 | Breer et al. ............. 244/134 R |
| 6,592,078 B2 | * | 7/2003 | Porte et al. ............. 244/134 B |

FOREIGN PATENT DOCUMENTS

| | | |
|---|---|---|
| EP | 0 823 547 | 2/1998 |
| EP | 1 103 462 | 5/2001 |

* cited by examiner

Primary Examiner—Charles T. Jordan
Assistant Examiner—Stephen A. Holzen
(74) Attorney, Agent, or Firm—Young & Thompson (57) ABSTRACT

The invention relates to a process for de-icing an air intake cowling of a reaction motor, comprising a lip (6a), a de-icing system (10) for the lip and acoustic attenuation means (11) characterized in that it consists in constituting said acoustic attenuation means by separate islands (12) each formed of a sandwich comprising an acoustically resistive porous layer forming a portion (13) of the external envelope of the fan channel limited by said lip, a cellular core and a deflector (15), in constituting or covering the reflector of each island with the help of a common element (15) extending over all the islands (12), emplacing in communication the space or spaces between islands, on the one hand, with the interior of the lip (6a) and, on the other hand, with the exterior of the cowling so as to create a forced circulation of de-icing fluid from the interior of the lip to the outside of said cowling.

20 Claims, 7 Drawing Sheets

PROCESS FOR DE-ICING BY FORCED CIRCULATION OF A FLUID, AN AIR INTAKE COWLING OF A REACTION MOTOR AND DEVICE FOR PRACTICING THE SAME

BACKGROUND OF THE INVENTION

The present invention relates to de-icing air intake cowlings of reaction motors, particularly aircraft.

The requirements of the authorities for certification and the rules concerning noise imposed by airports limit the level of noise needed during takeoff and landing. The noise generated by a transport airplane arises both from the airframe and from the motor. The noise of the motor originates in different sources, such as for example the noise generated by the turbine or by the compressor or the noise generated by the fan.

The noise produced by the motor is preponderant over the noise generated by the airframe in the takeoff phase because the motor operates in full throttle.

This source of noise is detrimental. For example, above a certain value, the aircraft will not be permitted to take off or to land other than at certain specified times that are not troublesome for the local communities.

This is the reason why certain precautions are nowadays taken by aircraft builders and engine makers to decrease the sonic emissions of the motors installed in aircraft.

Thus, panels for the attenuation of noise engendered by aircraft motors are installed in certain places in the nacelle, for example at the intake and outlet of the fan channel, or else on the doors of the pressure reversers.

From FR 2 261 583, there is known an acoustical treatment for an air intake of an aircraft motor in which the acoustic panel is applied symmetrically to the fan channel for optimum suppression of noise.

In EP 0 823 547, so as to improve further the acoustic attenuation, there are added acoustic attenuation panels to the attack edges of the air intake lip of the cowling.

Nevertheless, these attack edges are subjected to temperature and moisture conditions such that at present ice forms on them. The formation and accumulation of ice on the attack edge of the air intake lip poses several problems. If large pieces of ice break off, they thus penetrate the air intake and are ingested by the motor, thereby risking damaging the elements of said motor and decreasing performance. Moreover, the accumulation of ice modifies the contours of the attack edge of the air intake lip and generates undesirable aerodynamic effects.

To solve these problems, de-icing systems for the air intake edge have been installed. They inject warm air under pressure, taken from the motor, directly onto the skin of the internal surface of the air intake lip to prevent in the most effective manner possible the formation and accumulation of ice under conditions of normal use of the motor.

However, in EP 0 823 547, panels constituted of a sandwich comprising a honeycomb structure bounded, on the air flow side, by an acoustically resistive layer and, on the opposite side, a rear reflector, are added to the interior of the attack edges of the air inlet lip.

These acoustic attenuation panels added to the attack edge of the lip form a hopper and preventing warm air under pressure to reheat the attack edge of said lip and to melt the ice which is accumulated thereon. Carrying out commercial flights can, under certain climatic conditions, be dangerous.

Thus, the conventional de-icing system with the injection of warm air under pressure cannot be used in the context of acoustic treatment such as described in EP 0 823 547.

Moreover, U.S. Pat. No. 5,841,079 discloses an acoustic attenuation panel located in the air inlet lip and permitting de-icing said lip. The air inlet comprises a lip comprising an acoustic panel and a device for the injection of fluid under pressure, said fluid having a temperature sufficient to avoid the formation of ice on the air inlet lip. The acoustic panel is conventionally: a honeycomb core sandwiched between a porous layer and an acoustical reflecting layer. The porous layer and the acoustically reflecting layer are both pierced with holes so as to permit the fluid under pressure to pass through the acoustic panel and de-ice the lip.

However, the geometry and dimensions of the air inlet are adapted to the performance of the motor. The latter thus "seize" an airflow rate corresponding to the inlet air.

Nevertheless, the device described in U.S. Pat. No. 5,841,079 increases, because of said holes, the air flow ingested by the motor. The motor can thus be facing different airflow rates accordingly as the de-icing system is activated or not. This has a certain effect on its performance, runs counter to the wishes of engine builders who define the performance of their engines relative to a fixed air intake geometry.

Moreover, the confrontation in the cells of the honeycomb, of the sonic waves with the fluid under pressure, disturbs the operation of the acoustic panel, which decreases the acoustic efficiency of said panel.

The invention seeks to overcome the drawbacks and limitations of the existing systems set forth above, by providing a solution permitting associating the conventional de-icing system with the injection of warm air under pressure, and the addition in the attack edge of the air inlet lip of an acoustic attenuation panel.

SUMMARY OF THE INVENTION

To this end, the invention has for its object a process for de-icing an air intake cowling of a reaction motor, comprising an air inlet lip, a system for de-icing the lip supplied with warm fluid under pressure, and means for acoustic attenuation forming an integral portion of a predetermined region of said lip, characterized in that it consists in constituting said acoustic attenuation means by separate islands each formed by a sandwich comprising an acoustically resistive porous layer forming a portion of the external envelope of the fan channel delimited by said air intake lip, a single or multi-layer porous cellular core, and a reflector, constituting or covering the reflector of each island with a common element extending over all the islands, placing in communication the space or spaces between the islands, on the one hand, with the interior of the lip and, on the other hand, with the exterior of the cowling so as to create forced circulation of the de-icing fluid from the interior of the lip to the exterior of said cowling via the space or spaces between islands.

The de-icing function of the air intake lip, particularly in line with the blower channel, where the acoustic attenuation structure is located, is efficaciously produced by the flow of warm fluid which, thanks to the pressure difference between the interior of the lip and the exterior of the air intake cowling, is made to sweep through the space or spaces between the islands, delimited between the internal wall of the lip and the element covering the assembly of the cellular structure, through one or several openings provided on a section of said structure, to exit through one or several outlet openings, for example provided opposite the intake openings, the outlet openings being connected by one or several conduits to one or several openings for escape to the exterior of the cowling, by the de-icing fluid.

The de-icing fluid is, during the passage through said space or spaces between islands, made to bathe the internal surface of the internal wall of the lip that is not covered by the islands.

Effective de-icing is thus ensured at the height of the internal wall of the lip and without the rejection of de-icing fluid into the fan channel because where the fluid bathes said wall, there is no communication with the outside of the lip, the wall of this latter at this place not being porous.

Increased de-icing is moreover performed by said porous surfaces of the islands, which bathe in the warm fluid, by conduction or through the cellular structure.

The islands can have different structures and be constituted by juxtaposed strips of a honeycomb material or of juxtaposed tubular lugs perpendicular to the wall of the air intake lip.

The invention also has for its object a device for deicing an air intake cowling, produced according to the above process, comprising an air intake lip, means for injecting into the lip a warm de-icing fluid under pressure, acoustic attenuation means forming an integral portion of a predetermined region of said lip and means for evacuating to outside the cowling the de-icing fluid, characterized in that said acoustic attenuation means are constituted by separate islands each formed of a sandwich comprising an acoustically resistive porous layer forming a portion at least of the internal wall of the lip, a central cellular core and a reflector, said reflector being constituted by a common element extending over all the islands whilst the islands are arranged so as to permit the passage of the de-icing fluid through the spaces between islands, said de-icing device moreover comprising a chimney device connecting said spaces between islands to the external wall of the air intake cowling.

According to one embodiment, said islands are constituted by tubular lugs disposed in an annular region of the lip and arranged such that the spaces between the lugs will be, on a flank of said zone, in communication with the interior of the lip, and, on the other flank of said zone, in communication with a space connected to said chimney device.

According to another embodiment, said islands are constituted by strips of honeycomb cores defining between them corridors, arranged in an annular region of the lip and arranged such that said corridors will be, on one flank of said zone, in communication with the interior of the lip, and, on the other flank of said zone, in communication with a space connected to said chimney device.

According to still another embodiment, said islands are in the shape of strips disposed parallel to the lip and arranged such that at at least one of their ends, the corridors between bands will be in communication with the interior of the lip, said chimney device being connected to said corridors at their other end or at a point located between the two ends.

BRIEF DESCRIPTION OF THE DRAWINGS

Other characteristics and advantages of the process of the invention will become apparent from the description which follows, of various embodiments, which description is given solely by way of example and with respect to the accompanying drawings, in which.

DETAILED DESCRIPTION OF THE PREFERRED EMBODIMENTS

Figure 1:
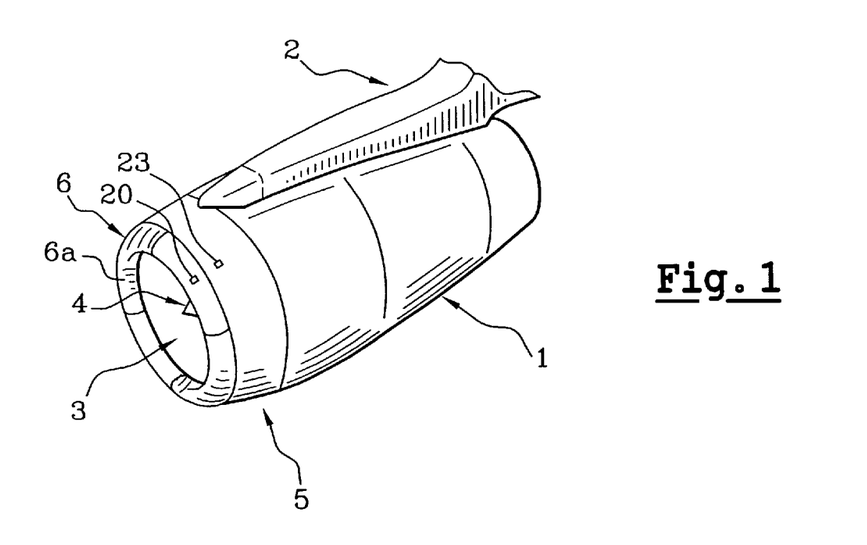
FIG. 1 is a schematic perspective view of an aircraft reaction motor.

There is shown in FIG. 1 an aircraft turbo reactor comprising a nacelle 1 coaxially surrounding the motor itself and fixed for example to a wing (not shown) of the aircraft by means of a mast generally designated by reference numeral 2.

The nacelle 1 has an annular cross-section and defines between itself and the central portion of the motor, an annular channel 3 called a fan channel. There is shown at 4 in the drawing, the nose of ogive shape of the fan driven by the motor and which is disposed at the inlet of the channel.

The front portion of the nacelle defines an air intake cowling 5 which has for its function to ensure the aerodynamic flow of the air, on the one hand, toward the fan channel 3 and, on the other hand, toward the exterior of the nacelle 1.

Figure 2:
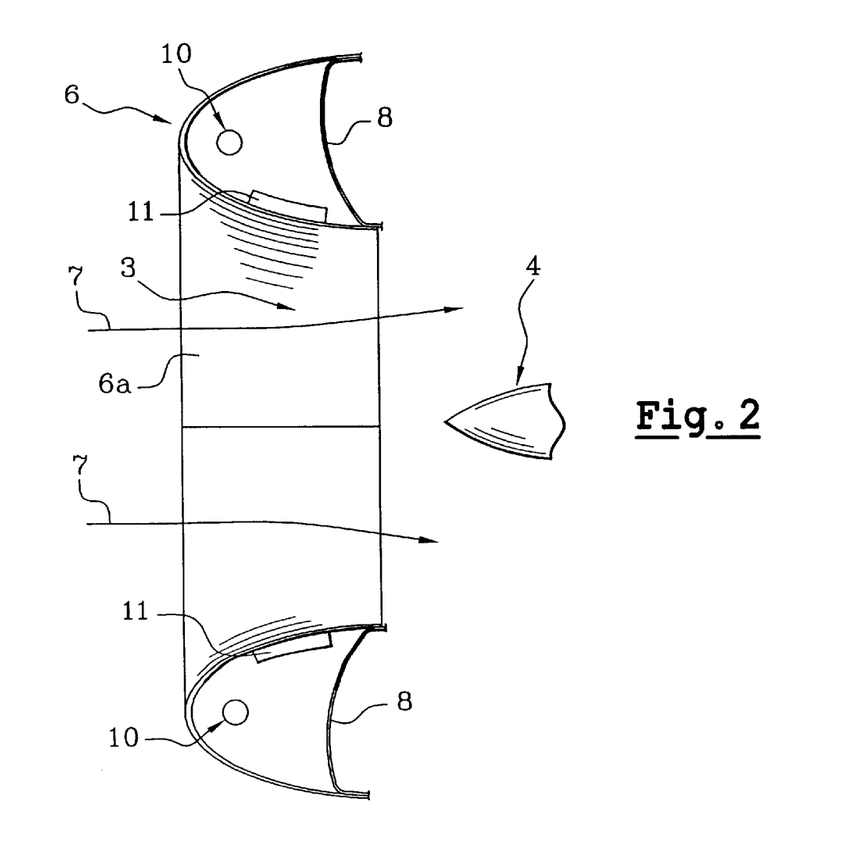
FIG. 2 is an axial cross-sectional view of the air intake lip of the motor of FIG. 1.

As can be seen in FIG. 2, which is in fragmentary axial cross-section of the cowling 5, the latter is prolonged forwardly by an air intake lip 6 having a U-shaped cross-section opening rearwardly. This lip ensures the division of the air between the portion 7 which enters the fan channel and the portion which flows about the nacelle.

The rear of the lip 6 is formed by an internal partition 8.

As shown schematically in FIG. 2, the invention seeks to combine de-icing of the lip 6, in particular its wall delimiting the inlet of the fan channel 3, with the help of a conventional system using warm air under pressure delivered into the annular space delimited by the lip, and an acoustical attenuation about the internal periphery of the lip.

The de-icing system is for example constituted by an annular tubing indicated at 10, provided with a plurality of ejection orifices or equivalent system, also known and formed by injectors with one or several injection nozzles.

According to the invention, particularly the wall of the lip 6 turned toward the fan channel 3, is provided with an acoustical attenuation structure of the sandwich type constituted by a cellular core or the like, covered, on the one side, with an acoustically resistive porous layer and, on the other side, with a total reflector, said structure being symbolized at 11 in FIG. 2 and extending preferably circularly over all the internal periphery of the lip.

The lip 6 is generally constituted by four sections or sectors of 90°, as shown in FIG. 1, abuttingly joined with fasteners.

Figure 3:
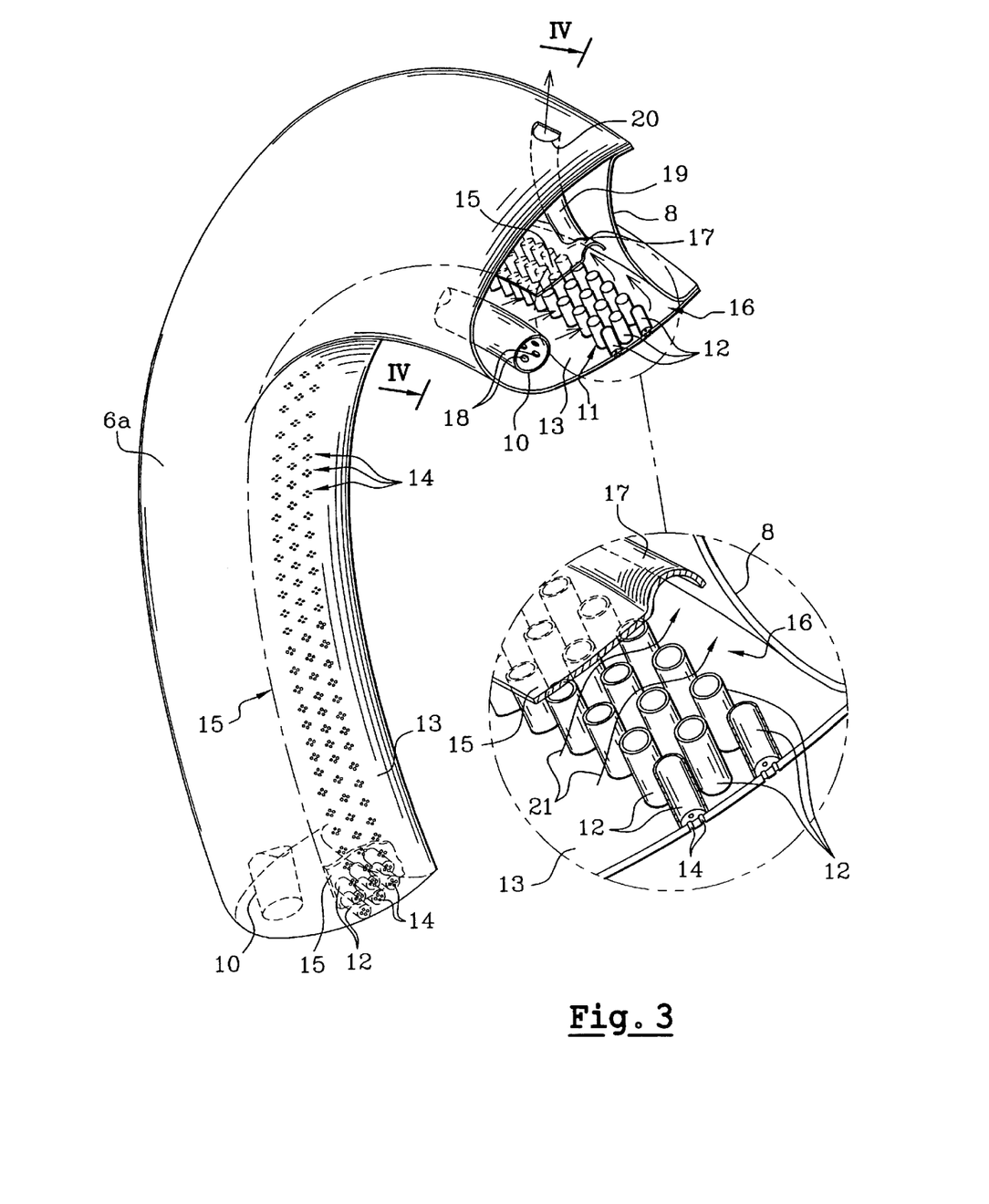
FIG. 3 is a perspective view of a sector of the air intake lip of FIG. 2, provided with an acoustic attenuation device with a de-icing function according to the invention.

FIG. 3 shows in perspective one of these sectors, 6a, provided with an acoustic attenuation structure 11 according to a first embodiment.

This structure is constituted by separate tubular lugs 12, fastened against the internal surface of the internal wall 13 of the lip, over a region of this latter in the shape of a strip extending over all the length of the sector 6a parallel to the tubing 10.

The lugs 12 are at a constant distance from each other which can vary, as can the diameter and height of the lugs, according to the desired acoustic attenuation modalities.

The lugs 12 are for example hollow tubes fixed perpendicular to the wall 13, in any desired distribution, aligned or not. They can for example be in a quincunx as shown in FIG. 3.

The lugs 12 can be of various materials, particularly metal, in which case they are fixed to the wall 13 by welding or soldering, the lip 6 being also metallic. The lugs can also be fixed by cementing.

The portions of the wall 13 facing the lugs 12 are pierced with holes 14 whose diameter and number are a function of the desired acoustic attenuation modalities.

The end of the lugs 12 opposite the holes 14 is closed by a covering element 15 forming a total reflector and common to all the lugs by covering all the structure 11 from one end to the other of the sector 6a.

The volume thus formed between the wall 13 and the covering element 15 which is parallel to it, comprises a portion constituted by the lugs 12 which form a resonator communicating with the exterior of the lip 6 via the holes 14 and a portion constituted by the spaces between the lugs 12 which opens, on the one hand, onto one of the flanks in the direction of the tubing 10 and on the other hand at its opposite flank in the direction of a space 16 which is isolated from the zone where the tubing 10 is located and is in communication with the external atmosphere at the air intake lip.

To this end, the covering element 15 defines at the height of said space 16, between the lugs 12 and the partition 8 and over all the length of the sector 6a, an inverted trough 17 in the form of a channel adapted to collect de-icing air from the ejection openings 18 of the tubing 10, after having passed through said space between the lugs 12, in the direction of a chimney 19, secured to the partition 8 and rejecting the air to outside the lip through an opening 20 of suitable shape and size.

The trough 17 is in contact over its free flank with the partition 8.

Figure 4:
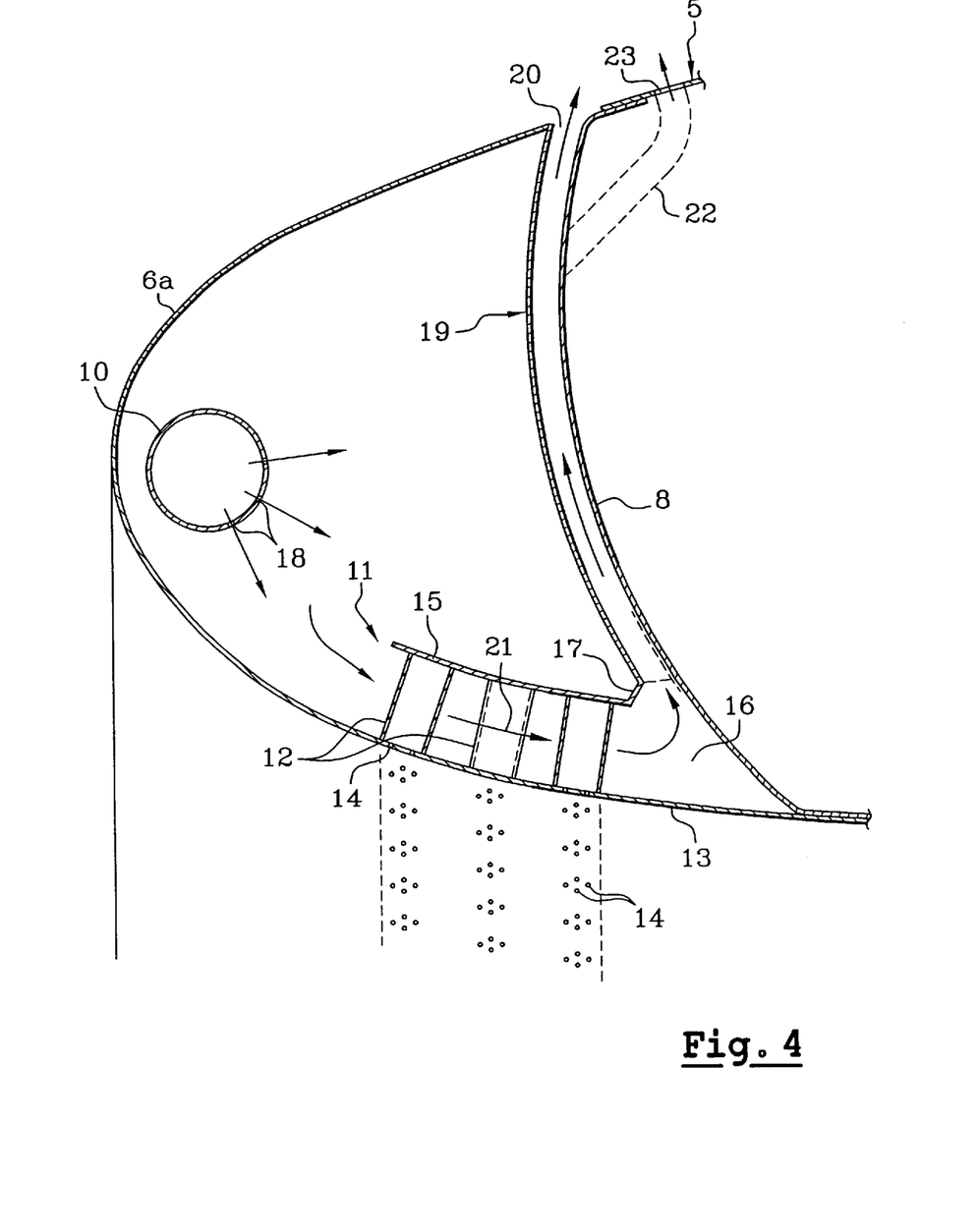
FIG. 4 is a cross-sectional view of the lip of FIG. 3, at the height of the line IV—IV.

As shown in FIG. 4, which is a cross-section of the device of FIG. 3 whose plane includes the axis of the fan channel 3 and the axis of the chimney 19, the chimney 19 is formed by a conduit extending along the partition 8.

There is thus created, according to the invention, between the space 16 solely in communication with the atmosphere external to the air intake cowling and the space adjacent the tubing 10, a substantial pressure difference forcing the de-icing air from the tubing 10 to move through (arrows 21, FIGS. 3 and 4) the space between the lugs 12, and hence to bathe the internal surface of the wall 13 between the lugs.

Such an arrangement produces in line with the region of the lugs 12 both a good acoustical attenuation thanks to the resonators of the structure 11, and good de-icing of the wall 13 thanks to said warm air for forced circulation.

It is to be noted that supplemental de-icing is performed in line with the perforated portions (14) of the wall 13 by conduction through the resonators (12).

It is also to be noted that the de-icing air is rejected to outside the cowling 5 and hence does not mingle with the flow entering the fan channel 3.

The arrangement of the lugs 12, for example in quincunx, gives a better mixing of the flow circulating in the space between lugs and a better heat exchange quality.

The size and distribution of the holes is determined by computer, in a known manner, as a function of the different parameters connected to the frequency characteristic of the noise to be attenuated, to the type of the motor, to the nacelle, to the materials used, as well as to the conditions of operation and use of the motor and of the aircraft. The object which is sought is to achieve the best ratio between acoustic gain and loss of directly de-iced surface.

Once the parameters relative to the holes 14 have been determined, these are pierced in the wall 13 by being grouped as shown in FIG. 3 at the height of the future lugs 12 which will be then applied and secured to the internal surface of the wall 13.

The sector 6a comprises a single chimney 19 which can be disposed at any location, for example adjacent one end of the sector 6a as shown in FIG. 3, or in the middle.

Several chimneys such as 19 can be provided for each sector, each opening through an opening such as 20.

As a modification, the chimney or chimneys 19 can open no longer through the lip (6a) but instead downstream in the cowling 5 via (FIG. 4) a conduit 22 passing through the partition 8 and ejecting air outside the cowling 5 through an opening 23 analogous to opening 20.

As a modification, the lugs 12 could be disposed in parallel alignments of juxtaposed lugs.

In the embodiment of FIGS. 3 and 4, the acoustic attenuation structure is a cellular structure whose cells are individual and constituted by tubular elements 12. Equivalent structures could of course be envisaged such as a structure of the honeycomb type.

Figure 5:
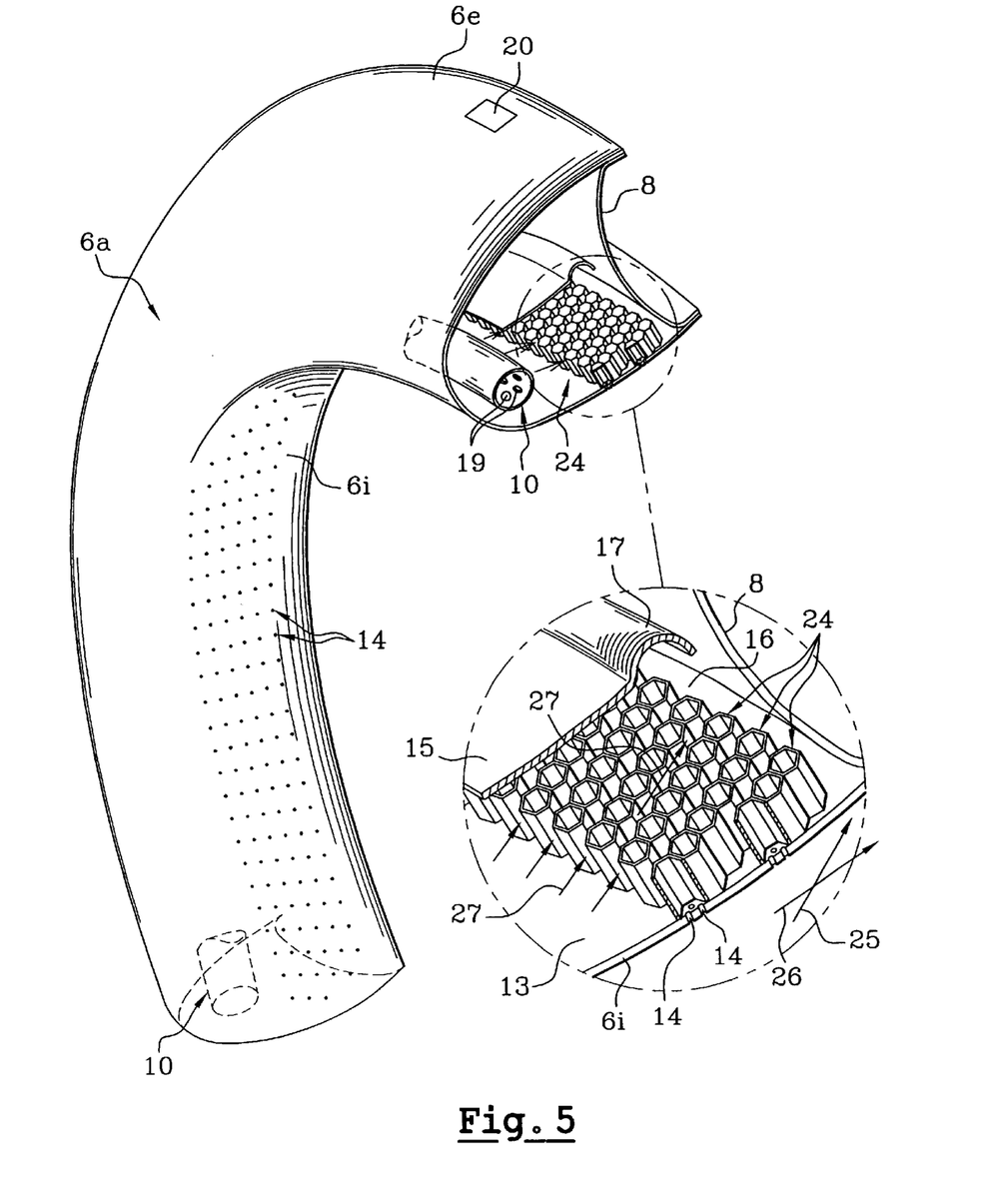
FIG. 5 is a view similar to that of the enlarged cross-section of FIG. 3, showing a modified embodiment of the acoustical attenuation structure.

In FIG. 5, there is shown such a structure constituted, instead of and in place of the lugs 12, by strips 24 of aligned honeycomb cells whose axes are perpendicular to the wall 13 of the lip. The strips 24 are parallel in a direction for example inclined (arrow 25) relative to the axis (arrow 26) of the fan channel 3 as shown, for better heat exchange.

The cells of the strips 24 are formed, on the wall 13 side, by a zone of this latter provided with holes 14 with the proviso that on the opposite side the cells are closed by a common skin 15 identical to the skin 15 of FIGS. 3, 4. The skin defines a collection trough 17 analogous to the trough 17 of FIGS. 3, 4, collecting de-icing air after having passed through (arrows 27) the corridors between strips 24 and ejecting it outside the cowling 5, through one or several chimneys analogous to the chimney 19 toward one or several openings analogous to the openings 20, 23.

The strips 24 comprise one or several juxtaposed rows of cells. The interval between strips 24 is variable, as is the orientation of these latter.

The characteristics of the cells, namely the height, size, can vary over a wide range. Similarly to the lugs 12, each cell can be constituted by a mono-resonator or by a multi-resonator with the help of septa.

Figure 6:
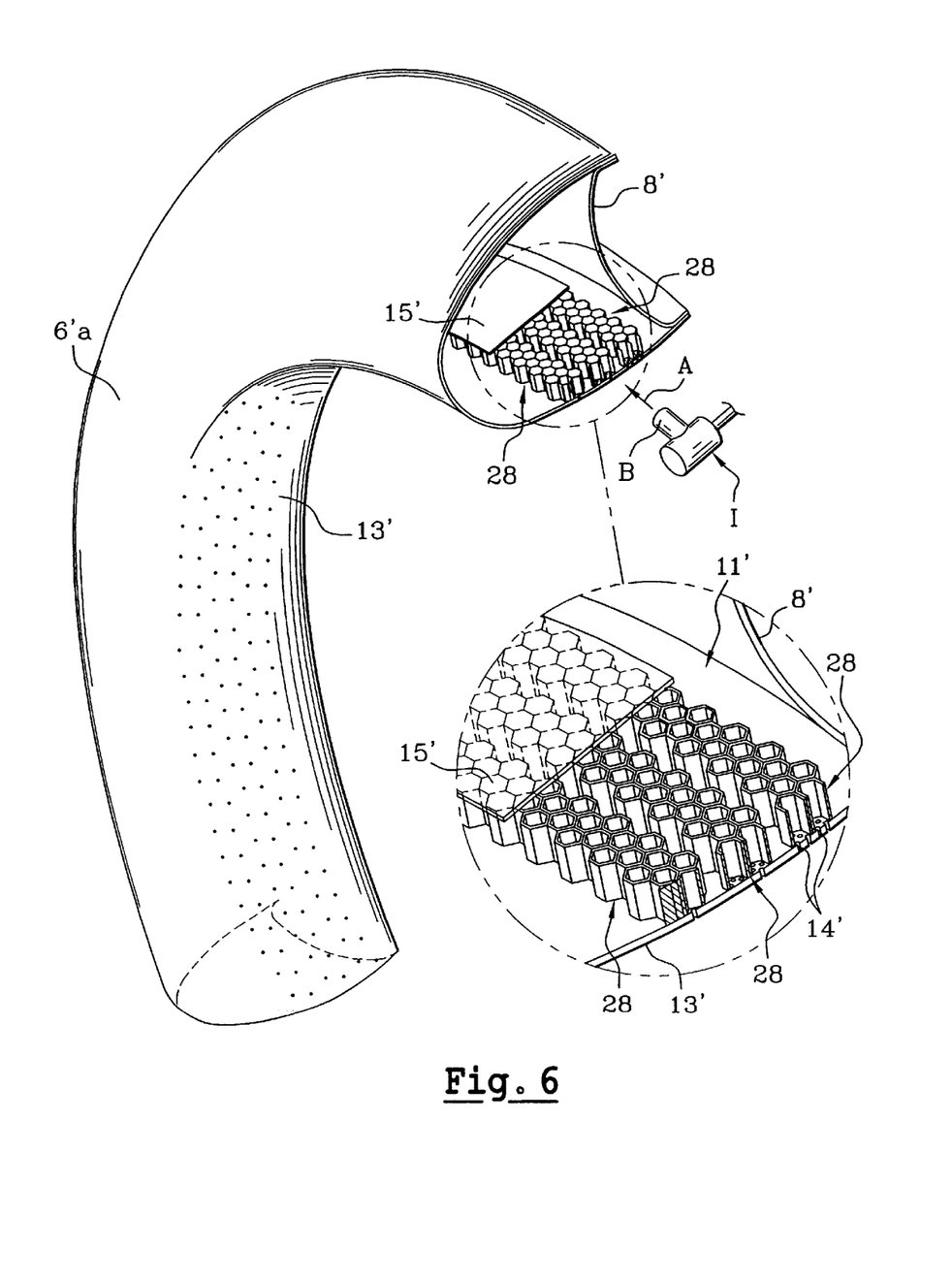
FIG. 6 is a view similar to that of FIG. 3, showing another modified embodiment of the acoustic attenuation structure.
Figure 7:
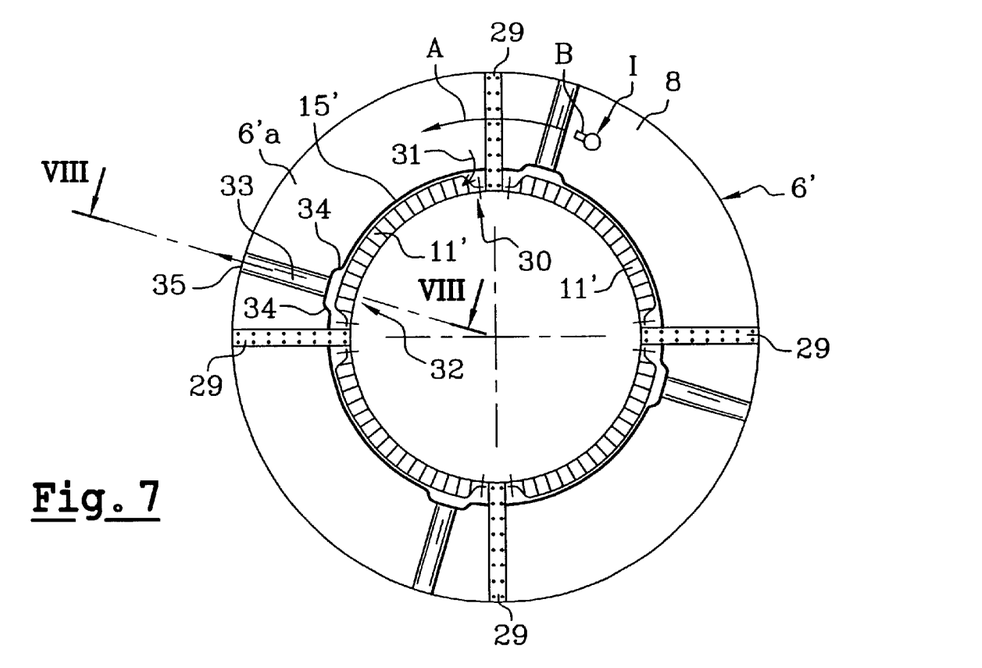
FIG. 7 is a front view in cross-section perpendicular to the axis of the fan channel, of a lip constituted by a structure of the type of FIG. 6.
Figure 8:
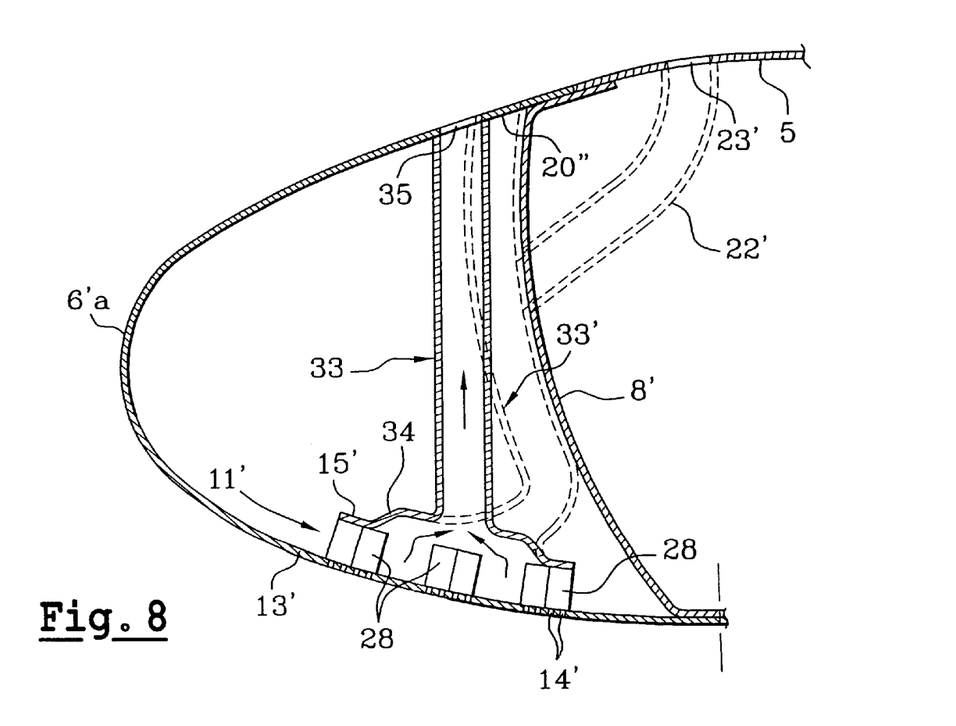
FIG. 8 is a schematic cross-sectional view on the line VIII—VIII of the lip of FIG. 7

Reference will now be made to FIGS. 6 to 8 showing another embodiment of the device of the invention in which the circulation of de-icing air within the acoustic attenuation structure no longer takes place in a general manner substantially parallel to the axis of the fan channel 3, as is the case of the devices of FIGS. 3 to 5, but in a general manner orthogonal to this axis, which is to say along a circular path within the lip 6.

In FIG. 6, which is similar to FIG. 3, there is shown a lip sector 6'a provided on the internal surface of the internal wall 13', with an acoustic attenuation structure formed by three strips 28 disposed parallel to the partition 8', which is to say to the lip, with a certain interval between them and extending from one end to the other of the sector 6'a.

Each strip 28 comprises three rows of cells of the honeycomb type.

As in the embodiment of FIG. 6, in line with the cells of the strips 28a, the wall 13' is pierced with holes 14', however opposite the holes, the cells are closed by a skin 15' forming a reflector and also covering the spaces forming corridors between the strips 28.

FIG. 7 is a front view in cross-section of a lip 6' constituted by four sectors such as the sector 6'a of FIG. 6, joined endwise by clips schematically shown at 29.

The de-icing air is introduced into the lip 6' with one or several injection systems such as the one shown at I in FIGS. 6 and 7, of which the nozzle or nozzles B are directed tangentially to the lip so as to give the air a circular trajectory (arrow A).

The air enters the corridors between strips 28 of the acoustic attenuation structure 11' at one end of the structure 11' of each sector for example at 30 (FIG. 7). The air flows (arrow 31) through these corridors and exits (at 32) at the other end of said structure 11' by being collected by a chimney device 33 whose purpose is to eject air to outside the lip 6'.

The chimney system comprises a chimney 33 properly so called, connected by a collection hopper 34 to the skin 15', said chimney being connected to an opening 35 for ejection to outside the lip 6' provided in the external wall of this latter.

The corridors between strips 28 are at their end, on the outlet side 32, of course closed so as to have a forced circulation effective between the inlet 30 and the outlet 32 in the acoustic attenuation structure 11'.

FIG. 8 is a cross-sectional view on the line VIII—VIII of FIG. 7, showing in greater detail the chimney system 33 and election hopper 34, arranged at the height of the outlet 32 of the acoustic attenuation structure 11' of the sector 6'a.

The positions of the chimney 33 and of the opening 35 for ejection to the outside, can of course vary within the lip.

The chimney system (33, 34) can thus be disposed at the center of the sector 6'a, the de-icing air being admitted to the corridors between the strips 28 at each end of the acoustic attenuation structure 11'.

The chimney, as shown in broken lines at 33' on FIG. 8, can be secured to the partition 8' to open into an ejection opening 20", as in the embodiment of FIG. 4, or else to open into an ejection opening 23' provided in the cowling 5, via a conduit 22' passing through the partition 8', also as in FIG. 4.

In the preceding embodiments, the cellular structures 11' are, according to the nature of the material used, secured to the internal wall 13' by cementing or welding or braising, with the interposition if desired of a metallic sheet, for example of aluminum, which will of course be pierced at the same places as the wall 13' to provide the holes 14'.

Figure 9:
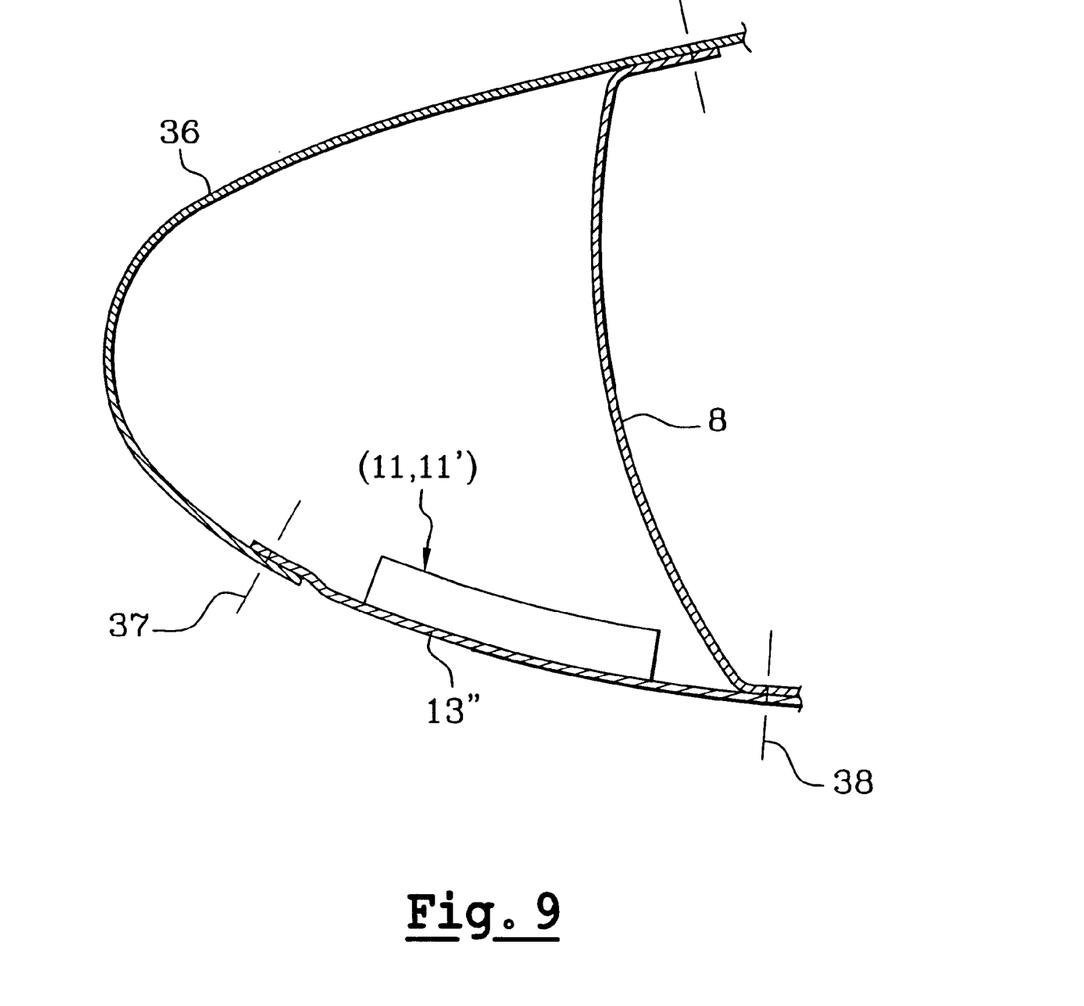
FIG. 9 is a schematic cross-sectional view of a lip whose wall delimiting the fan channel is constituted by two assembled sections.

Similarly to the preceding embodiments, the acoustic attenuation structures 11, 11' can be constituted by and integrated directly into a section of each sector (6a, 6'a) of the lip, such as the section 13" of FIG. 9, which will then be connected and secured to the supplemental section (36, 8) at 37 and 38 to form a complete lip, after emplacing the chimneys (19, 33) not shown in FIG. 9.

Although the embodiments of FIGS. 3 and 6 are shown and described in a de-icing system that is preferably and respectively of the annular tubular type 10 and of the tangential injector type 1, each de-icing system can be designed for any one of the embodiments.

It is to be noted that the strips 28 of honeycomb cells could be replaced by alignments of juxtaposed tubular lugs, such as for example the lugs 12 of the embodiment of FIG. 3.

Finally, as a modification, the acoustic attenuation structures 11, 11' could be completed by, that is to say include for each resonator, a reflector, the islands formed by these structures being then entirely covered with an element analogous to the skin 15 or 15', so as to close the spaces between the islands and to ensure the forced circulation of the de-icing air through said spaces.

What is claimed is:

1. A de-icing device for an air intake cowling comprising:
    an air intake lip;
    means for injecting a warm de-icing fluid under pressure into said lip;
    an acoustic attenuation structure forming an integral portion of a predetermined region of said lip; and
    means for evacuating the de-icing fluid outside of the cowling,
    wherein said acoustic attenuation structure comprises plural separate islands each formed of a sandwich comprising an acoustically resistive porous layer forming a portion of at least an internal wall of said lip, a central cellular core and a reflector, said reflector being common to and extending over all said plural islands, said plural islands being structured and arranged to pass the de-icing fluid through spaces between said plural islands, said reflector guiding the de-icing fluid through said spaces.

2. The de-icing device according to claim 1,
    wherein said means for evacuating the de-icing fluid outside the cowling comprises a chimney device connecting said spaces with an external wall of the cowling,
    wherein said islands are tubular lugs disposed in an annular region of said lip and are structured and arranged such that the spaces between the lugs are in fluid communication with an interior of the lip on one side of said annular region and in communication with said chimney device on another side of said region.

3. The de-icing device according to claim 1, wherein said means for evacuating the de-icing fluid outside the cowling comprises a chimney device connecting said spaces with an external wall of the intake cowling,
    wherein said islands are strips of honeycomb cells defining between them corridors, disposed in an annular region of the lip and arranged such that said corridors will be on one side of said region, in fluid communication with an interior of the lip and, on the other side of said region, in communication with a space connected to said chimney device.

4. The de-icing device according to claim 3, wherein said corridors between strips are at an acute angle with a longitudinal axis of a fan channel delimited by said lip.

5. The de-icing device according to claim 1, wherein said means for evacuating the de-icing fluid outside the cowling comprises a chimney device connecting said spaces with an external wall of the intake cowling,
    wherein said islands are in the form of strips disposed parallel to the lip defining corridors between strips and arranged such that one end of the corridors is in fluid communication with an interior of the lip, said chimney device being connected to another end of said corridors.

6. The de-icing device according to claim 5, wherein the chimney device comprises at least one chimney connected to an opening provided in an external wall of the lip.

7. The de-icing device according to claim 5, wherein the chimney device comprises at least one chimney connected to an opening provided in an external wall of the cowling downstream of the lip.

8. The de-icing device according to claim 1, wherein the means for injecting the de-icing fluid is an annular tubing having a plurality of ejection openings.

9. The de-icing device according to claim 1, wherein the means for injecting the de-icing fluid is at least one injector having at least one tangential ejection nozzle.

10. The de-icing device according to claim 1, wherein the lip is two sections, only one of said sections having the acoustic attenuation structure.

11. The de-icing device according to claim 1, wherein said means for evacuating the de-icing fluid outside the cowling comprises a chimney device connecting said spaces with an external wall of the intake cowling.

12. A process for de-icing an air intake cowling of a reaction motor, comprising an air intake lip, a system for de-icing said lip and acoustic attenuation means forming an integral portion of a predetermined region of said lip, said acoustic attenuation means comprising separate islands having spaces therebetween, each formed of a sandwich comprising an acoustically resistive porous layer forming a portion of an external envelope of a fan channel delimited by said air intake lip, a cellular core having at least one layer and a reflector comprising a common element extending over all of the islands, wherein said process comprises:

supplying said lip with warm fluid under pressure; and forcefully circulating said fluid from an interior of the lip to an exterior of said cowling via the spaces between the islands.

13. A de-icing device for an air intake cowling comprising:

an air intake lip;

a device for injecting a warm de-icing fluid under pressure into said lip;

an acoustic attenuation structure forming an integral portion of a predetermined region of said lip; and a chimney for evacuating said de-icing fluid outside of the cowling, wherein said acoustic attenuation structure comprises an acoustically resistive porous layer forming a portion of an internal wall of said lip, a continuous non-porous reflector and a plurality of spaced apart unconnected attenuation elements therebetween, said reflector being common to and extending over all of said plural attenuation elements.

14. The de-icing device according to claim 13, wherein said lip comprises a partition separating said lip from a downstream portion of said cowling, and wherein said reflector comprises a section connected to said partition.

15. The de-icing device according to claim 14, wherein said device for injecting a warm de-icing fluid under pressure into said lip is upstream of said acoustic attenuation structure, and wherein said plural attenuation elements are structured and arranged so that fluid from said device for injecting a warm de-icing fluid under pressure into said lip flows across said plural attenuation elements, into said section connected to the partition and then out through said chimney.

16. The de-icing device as claimed in claim 13, wherein said plural attenuation elements are tubular lugs separated by a constant distance from each other.

17. The de-icing device as claimed in claim 16, wherein said lugs are in a quincunx.

18. The de-icing device as claimed in claim 13, wherein said attenuation elements are strips of honeycomb cells having corridors between strips, said corridors are in fluid communication with said chimney.

19. The de-icing device as claimed in claim 18, wherein said strips are at an acute angle to a direction of air flow into said intake lip.

20. The de-icing device as claimed in claim 18, wherein said strips are orthogonal to a direction of air flow into said intake lip.

* * * * *